(12) United States Patent
Peters et al.

(10) Patent No.: US 12,419,332 B2
(45) Date of Patent: Sep. 23, 2025

(54) ELECTROLYTIC METHODS AND SYSTEMS FOR GENERATING TEMPER FLUID

(71) Applicant: Guardian Partners, LLC, Denver, CO (US)

(72) Inventors: Michael J. Peters, Denver, CO (US); John D. Breedlove, Denver, CO (US); Darin Jensen, Denver, CO (US); Seth Robert Mayer, Denver, CO (US)

(73) Assignee: STRATEGIC RESOURCE OPTIMIZATION, INC., Fort Collins, CO (US)

( * ) Notice: Subject to any disclaimer, the term of this patent is extended or adjusted under 35 U.S.C. 154(b) by 0 days.

(21) Appl. No.: 17/806,217

(22) Filed: Jun. 9, 2022

(65) Prior Publication Data

US 2023/0000119 A1    Jan. 5, 2023

Related U.S. Application Data

(60) Provisional application No. 63/209,817, filed on Jun. 11, 2021.

(51) Int. Cl.
*A23L 7/10* (2016.01)
*A23L 29/00* (2016.01)

(52) U.S. Cl.
CPC ............. *A23L 7/197* (2016.08); *A23L 29/035* (2016.08)

(58) Field of Classification Search
CPC . A23L 3/358; A23L 7/197; A23L 3/34; A23L 29/035; A23L 3/3454; C02F 1/4674; C02F 2209/04; C02F 2209/05; C02F 2103/26; C02F 2101/306; C02F 2305/04; C02F 1/66; C02F 2209/06

USPC ........................................................ 426/532
See application file for complete search history.

(56) References Cited

U.S. PATENT DOCUMENTS

| | | | |
|---|---|---|---|
| 3,816,276 | A | 6/1974 | Ichiki et al. |
| 4,853,040 | A | 8/1989 | Mazur et al. |
| 5,932,171 | A | 8/1999 | Malchesky |
| 6,478,947 | B2 | 11/2002 | Nagasaku et al. |
| 6,565,736 | B2 | 5/2003 | Park et al. |
| 6,623,615 | B1 | 9/2003 | Morisawa et al. |

(Continued)

FOREIGN PATENT DOCUMENTS

| | | |
|---|---|---|
| CN | 101779754 B | 7/2012 |
| CN | 105838496 A | 8/2016 |

(Continued)

OTHER PUBLICATIONS

Sun, Chao, et al., "Role of aqueous chlorine dioxide in controlling the growth of Fusarium graminearum and its application on contaminated wheat", LWT—Food Science and Technology, vol. 84, 2017, pp. 555-561 (6 pages).

(Continued)

*Primary Examiner* — Subbalakshmi Prakash
(74) *Attorney, Agent, or Firm* — Holzer Patel Drennan

(57) ABSTRACT

Methods and systems for generating a highly energized fluid formula for use in tempering grains and other foodstuffs is described. The temper fluid described herein is capable of reducing pathogens and/or pesticide residues on grains and other foodstuffs. The tempering fluid may include chlorine dioxide with an oxidative carrier solution, and may further include carboxylic acids. The methods described herein may include an alkaline fluid pre-rinse prior to treatment of the grain with the energized fluid formula.

26 Claims, 7 Drawing Sheets

(56) References Cited

U.S. PATENT DOCUMENTS

| | | |
|---|---|---|
| 7,011,739 B2 | 3/2006 | Harkins et al. |
| 7,722,830 B2 | 5/2010 | Kimura et al. |
| 7,849,788 B2 | 12/2010 | Macaluso |
| 8,007,654 B2 | 8/2011 | Field et al. |
| 8,062,500 B2 | 11/2011 | Sumita |
| 8,157,981 B2 | 4/2012 | Peters et al. |
| 8,227,015 B2 | 7/2012 | Bruinsma et al. |
| 8,333,883 B2 | 12/2012 | Peters et al. |
| 8,394,253 B2 | 3/2013 | Peters et al. |
| 9,096,450 B2 | 8/2015 | Andrews et al. |
| 9,107,967 B2 | 8/2015 | O'Connell |
| 9,260,676 B2 | 2/2016 | Faulconbridge et al. |
| 9,445,602 B2 | 9/2016 | Peters et al. |
| 9,765,268 B2 | 9/2017 | Rogers |
| 10,512,855 B2 | 12/2019 | Faulconbridge et al. |
| 10,676,663 B2 | 6/2020 | Breedlove et al. |
| 2003/0089618 A1 | 5/2003 | Satoh et al. |
| 2006/0263240 A1 | 11/2006 | Hopkins |
| 2009/0311137 A1 | 12/2009 | Field |
| 2010/0119616 A1 | 5/2010 | Chen et al. |
| 2015/0051135 A1 | 2/2015 | Hermann et al. |
| 2015/0375025 A1 | 12/2015 | Willey et al. |
| 2016/0040305 A1 | 2/2016 | Nuñez Montalvo |
| 2016/0044926 A1 | 2/2016 | Peters et al. |
| 2018/0305604 A1 | 10/2018 | Breedlove et al. |
| 2019/0055142 A1 | 2/2019 | Moyer et al. |
| 2020/0131057 A1 | 4/2020 | Jansen |
| 2021/0000107 A1 | 1/2021 | Politopoulos et al. |
| 2021/0214248 A1 | 7/2021 | Echeverry Campos |

FOREIGN PATENT DOCUMENTS

| | | |
|---|---|---|
| CN | 106006852 A | 10/2016 |
| CN | 107156605 A | 9/2017 |
| CN | 107244717 A | 10/2017 |
| CN | 105418784 B | 3/2018 |
| CN | 109730239 A | 5/2019 |
| CN | 110343568 A | 10/2019 |
| CN | 111227164 A | 6/2020 |
| CN | 107012182 B | 2/2021 |
| GB | 191412308 A | 6/1915 |
| GB | 191416664 A | 7/1915 |
| JP | 61231962 A2 | 10/1986 |
| JP | 2006320305 A2 | 11/2006 |
| JP | 4607296 B2 | 10/2010 |
| JP | 4801945 B2 | 8/2011 |
| KR | 100532860 B1 | 12/2005 |
| MD | 980197 A | 6/2000 |
| RU | 2563935 C2 | 9/2015 |
| WO | 2006102680 A2 | 9/2006 |

OTHER PUBLICATIONS

Ding, Tian, et al., "Electrolyzed Water in Food: Fundamentals and Applications", Springer Nature Singapore Pte Ltd. and Zheijian University Press, Hangzhou 2018, https://doi.org/10.1007/978-981-13-3807-6, 2019, 280 pages.

Ewatersystems, "Electrolysed Water: A natural alternative for removing chemical residue on food", https://ewatersystems.com/ewaterworldarchive/2018/10/29/electrolysed-water-a-natural-alternative-to-agricultural-chemical-residue, Oct. 29, 2018, 4 pages.

Fan, Sufang, et al., "Removal of aflatoxin B(1) in edible plant oils by oscillating treatment with alkaline electrolysed water", Food Chemistry, vol. 141.3, Dec. 1, 2013, 3118-3123 (2-pages).

Hao, J., et al., "Reduction of Pesticide Residues on Fresh Vegetables with Electrolyzed Water Treatment", College of Food Science and Nutritional Engineering, China Agricultural Univ., Beijing, P.R. China, Journal of Food Science, vol. 76 (4), May 5, 2011, pp. C520-C524, 6 pages.

Li, Zhi-Hao, "Effect of alkaline electrolyzed water on physicochemical and structural properties of apricot protein solate", Food Sci Biotechnol (2019), vol. 28(1), Aug. 3, 2018, pp. 15-23 (9 pages).

Shimamura, Yuko, et al., "The application of alkaline and acidic electrolyzed water in the sterilization of chicken breasts and beef liver", Food Science & Nutrition, vol. 4(3) (https://www.ncbi.nlm.nih.gov/pmc/articles/PMC4867763/), Nov. 1, 2015, 431-440 (19 pages).

Wu, Yangliu, et al., "Comparison of Different Home/Commercial Washing Strategies for Ten Typical Pesticide Residue Removal Effects in Kumquat, Spinach and Cucumber", Int. J. Environ. Res. Public Health 2019, vol. 16, Feb. 6, 2019, 1-20 (20 pages).

Feng, P., et al., "Biomass-based activated carbon and activators: Preparation of activated carbon from corncob by chemical activation with biomass pyrolysis liquids", ACS Omega, 5(37), https://doi.org/10.1021/acsomega.Oc03494, Sep. 9, 2020, pp. 24064-24072.

| Treatment | Replicate | CFU/g | Log10 CFU/g | Average Log10 | Average reduction from initial |
|---|---|---|---|---|---|
| Inoculated, untreated control | 1 | 2900000 | 6.46 | 6.49 | |
| | 2 | 1400000 | 6.15 | | |
| | 3 | 4700000 | 6.67 | | |
| | 4 | 6900000 | 6.84 | | |
| | 5 | 2700000 | 6.43 | | |
| | 6 | 2900000 | 6.46 | | |
| | 7 | 2100000 | 6.32 | | |
| | 8 | 5400000 | 6.73 | | |
| | 9 | 3800000 | 6.58 | | |
| | 10 | 1800000 | 6.26 | | |
| Treated with Temper Solution, before swell bin | 1 | 330 | 2.52 | 2.71 | 3.76 (±0.26) |
| | 2 | 310 | 2.49 | | |
| | 3 | 300 | 2.48 | | |
| | 4 | 720 | 2.86 | | |
| | 5 | 1800 | 3.26 | | |
| | 6 | 260 | 2.41 | | |
| | 7 | 300 | 2.48 | | |
| | 8 | 390 | 2.59 | | |
| | 9 | 350 | 2.54 | | |
| | 10 | 320 | 2.51 | | |
| Treated with Temper Solution, after 4h in swell bin (22- 25C) | 1 | 320 | 2.51 | 2.58 | 3.88 (±0.40) |
| | 2 | 720 | 2.86 | | |
| | 3 | 300 | 2.48 | | |
| | 4 | 90 | 1.95 | | |
| | 5 | 30 | 1.48 | | |
| | 6 | 720 | 2.86 | | |
| | 7 | 310 | 2.49 | | |
| | 8 | 400 | 2.60 | | |
| | 9 | 90 | 1.95 | | |
| | 10 | 350 | 2.54 | | |
| | 11 | 240 | 2.38 | | |
| | 12 | 150 | 2.18 | | |
| | 13 | 90 | 1.95 | | |
| | 14 | 300 | 2.48 | | |
| | 15 | 90 | 1.95 | | |
| | 16 | 180 | 2.26 | | |
| | 17 | 260 | 2.41 | | |
| | 18 | 150 | 2.18 | | |
| | 19 | 450 | 2.65 | | |
| | 20 | 1100 | 3.04 | | |
| | 21 | 1400 | 3.15 | | |
| | 22 | 300 | 2.48 | | |
| | 23 | 120 | 2.08 | | |
| | 24 | 320 | 2.51 | | |
| | 25 | 300 | 2.48 | | |
| | 26 | 45 | 1.65 | | |
| | 27 | 420 | 2.62 | | |
| | 28 | 700 | 2.85 | | |
| | 29 | 370 | 2.57 | | |
| | 30 | 1100 | 3.04 | | |

*FIGURE 5*

| Treatment | Replicate | CFU/g | Log10 CFU/g | Average Log10 | Reduction |
|---|---|---|---|---|---|
| Inoculated, untreated control | 1 | 7200000 | 6.86 | 7.19 | |
| | 2 | 7500000 | 6.88 | | |
| | 3 | 11000000 | 7.04 | | |
| | 4 | 66000000 | 7.82 | | |
| | 5 | 15000000 | 7.18 | | |
| | 6 | 14000000 | 7.15 | | |
| | 7 | 18000000 | 7.26 | | |
| | 8 | 13000000 | 7.11 | | |
| | 9 | 24000000 | 7.38 | | |
| | 10 | 16000000 | 7.20 | | |
| Treated with Temper Solution, before swell bin | 1 | 190000 | 5.28 | 5.29 | 1.90 (±0.36) |
| | 2 | 150000 | 5.18 | | |
| | 3 | 1700000 | 6.23 | | |
| | 4 | 130000 | 5.11 | | |
| | 5 | 90000 | 4.95 | | |
| | 6 | 120000 | 5.08 | | |
| | 7 | 230000 | 5.36 | | |
| | 8 | 110000 | 5.04 | | |
| | 9 | 200000 | 5.30 | | |
| | 10 | 210000 | 5.32 | | |

*FIGURE 6A*

| Treatment | Replicate | CFU/g | Log10 CFU/g | Average Log10 | Reduction |
|---|---|---|---|---|---|
| Treated with Temper Solution, after 4 h in swell bin (22-25C) | 1 | 8100 | 3.91 | 3.93 | 3.26 (±0.33) |
| | 2 | 5100 | 3.71 | | |
| | 3 | 4500 | 3.65 | | |
| | 4 | 13000 | 4.11 | | |
| | 5 | 6300 | 3.80 | | |
| | 6 | 14000 | 4.15 | | |
| | 7 | 4800 | 3.68 | | |
| | 8 | 3000 | 3.48 | | |
| | 9 | 9900 | 4.00 | | |
| | 10 | 3300 | 3.52 | | |
| | 11 | 7500 | 3.88 | | |
| | 12 | 14000 | 4.15 | | |
| | 13 | 7800 | 3.89 | | |
| | 14 | 13000 | 4.11 | | |
| | 15 | 19000 | 4.28 | | |
| | 16 | 54000 | 4.73 | | |
| | 17 | 12000 | 4.08 | | |
| | 18 | 2400 | 3.38 | | |
| | 19 | 13000 | 4.11 | | |
| | 20 | 5100 | 3.71 | | |
| | 21 | 11000 | 4.04 | | |
| | 22 | 33000 | 4.52 | | |
| | 23 | 2700 | 3.43 | | |
| | 24 | 7500 | 3.88 | | |
| | 25 | 15000 | 4.18 | | |
| | 26 | 4800 | 3.68 | | |
| | 27 | 8700 | 3.94 | | |
| | 28 | 12000 | 4.08 | | |
| | 29 | 2900 | 3.46 | | |
| | 30 | 24000 | 4.38 | | |

*FIGURE 6B*

ELECTROLYTIC METHODS AND SYSTEMS FOR GENERATING TEMPER FLUID

CROSS-REFERENCE TO RELATED APPLICATION(S)

The present application claims priority under 35 U.S.C. § 119(e) to U.S. Provisional Patent Application No. 63/209,817, filed Jun. 11, 2021, the entirety of which is hereby incorporated by reference.

BACKGROUND

The treating of grain for the removal/reduction of pathogens and residues in raw agricultural products has risen in importance across the globe in the last several years. Many thousands of tons of grain are brought to processing facilities to be converted to food, industrial and feed products every day. The proper treatment and decontamination of these grain products is necessary to generate the highest possible product quality, from both an economic perspective but more importantly, from a human and animal safety standpoint.

According to the CDC, In the past few years several *E. coli* infections have been linked to contaminated flour. These events have required several recalls of flour, cookie dough and brownie mixes in numerous states. Product labels have also been changed to reflect that flour is a raw agricultural product and requires cooking prior to consumption.

Other contaminants on raw grains may include molds, yeast and/or bacteria. These contaminants can be activated in a temper or other wet processing system and cause the spores to enter a vegetative state, adding to the contaminant load. Untreated, these various contaminants can also limit the shelf life of finished products made with flour.

Pesticide residues are also an issue and are becoming more recognized as cancer-causing agents. Currently, pesticides are not actively treated in the processing of grains and the residues can eventually end up in finished products.

Prior to milling, some grains go through a conditioning process known as tempering. Tempering is where water mixed with a small amount of disinfectant (e.g., bleach at ~150 ppm) is added to the grain to reduce contaminants during the softening of the exterior shell of the grain being processed. In the conditioning process, the grain absorbs the water and swells, therefore increasing the size of the grain and raising the moisture content. After the addition of the conditioning water, the grain is moved to conditioning bins, where it is left for ~30 minutes in the corn milling process and up to ~48 hours in the wheat milling process. Allowing the grain to set in the conditioning bins creates an environment that will allow the grain to enter the milling stage of the process and extraction of the germ.

Within the grain treatment and milling industry, it is widely accepted that there is always a level of surface contamination either on the incoming grain or grain undergoing the milling process. Thus, one of the problems with this approach is from placing damp grain in a dark bin without a very high reduction of contaminants (such as molds, yeast, bacteria, etc.), which can cause an actual increase in overall contaminant load.

Thereafter, the softened husks are removed, and the grain is put through a grinder to help separate the germ from the other grain components. The ground grain is carried to degerminators, where the germ is fully separated and kept for later processing. The grain is then put through a dry milling process where a variety of roller mills, sifters, and purifiers are used to produce flour or meal.

During the tempering process, the conditioning water that is added to the grain provides one of the only opportunities to impact the microbial levels of the final milled grain. It is imperative that during the dry milling process, with the addition of conditioning water, the moisture content (by weight) after mixing does not exceed 20%, and preferably closer to either 12% or 18% depending on the type of grain treated. These moisture parameters are put in place to manage the downstream handling and milling of the grains, as well as to limit the moisture amount in the final product without an additional drying step. Therefore, one major challenge is to treat the grain to the greatest possible extent without exceeding the moisture limitations inherent in the milling process itself.

Using certain chemical treatment options involves the risk of carry-over decontaminants into the final grain product. If residual chemicals, in particular chlorine, peroxyacetic acid, hypochlorous acid and/or sodium hypochlorite (bleach), leave residuals carried over from the treatment step to the final product, issues may arise in the quality of the product. For example, residual chlorine impacts the viability of yeast additives that are required during fermentation of the leavening of bread dough, rendering the product unusable. If the addition of chlorine-based chemicals to the conditioning water are dropped to a level where carry-over would no longer pose a threat, the biocidal capacity of the fluid would drop substantially, therefore not appreciably decontaminating the grain being treated as well as risking microbial tolerance to the treatment solution.

In addition, the agricultural industry has no formal way of addressing the growing issue of pesticide contamination (i.e., glyphosate). Glyphosate is the most common pesticide and is used globally with no easy way to remove or eliminate it from the milling process. If glyphosate is found in high enough concentrations in the incoming grain or in the final product, the grain must be discarded or blended with grain of a lower concentration of the pesticide.

Accordingly, a need exists for improved techniques and materials for use in the treatment of grains, and particularly for the removal of pathogens and/or pesticides therefrom.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a method of producing an electrolytic temper fluid includes the steps of combining a chlorite salt solution with a sodium hypochlorite solution to thereby provide a first composition; combining an oxidative acidic fluid with the first composition to thereby provide a second composition; and combining an anodic gas with the second composition to thereby provide an electrolytic temper fluid.

In some embodiments, a method of treating a foodstuff to remove pathogens and/or pesticides therefrom includes the steps of combining a chlorite salt solution a sodium hypochlorite solution to thereby provide a first composition; combining an oxidative acidic fluid with the first composition to thereby provide a second composition; and combining an anodic gas with the second composition to thereby provide an electrolytic temper fluid; and combining the electrolytic temper fluid with the foodstuff.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

FIG. 5 is a table providing experimental data relating to Example 4 discussed herein.

FIGS. 6A and 6B are table providing experimental data relating to Example 5 discussed herein.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
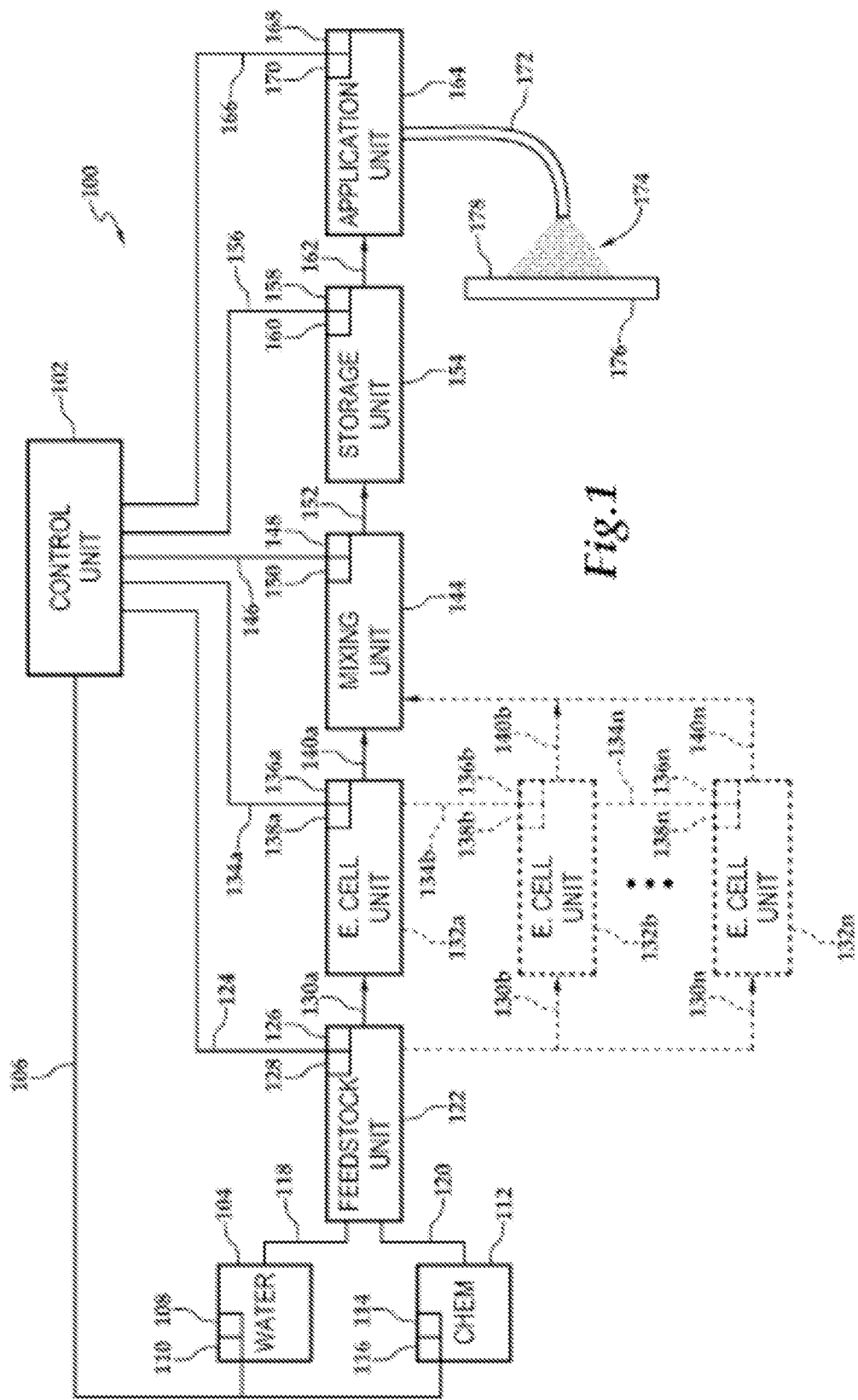
FIG. 1 is a block diagram of an electrolytic temper fluid generation system according to various embodiments described herein.

Referring to FIG. 1, an electrolytic system suitable for use in the production of a temper fluid is schematically illustrated and generally designated 100. System 100 includes a control unit 102 in communication with a water source 104 via communication link 106. Water source 104 may include sensors 108 for determining the physical and/or chemical properties of the contents of water source 104. Additionally, water source 104 may include meters, valves and/or pumps 110 for monitoring and pumping water from water source 104 to feedstock unit 122 via conduit 118.

System 100 may further include a chemical source 112 that is in communication with control unit 102 via communication link 106. Chemical source 112 may include sensors 114 for determining the physical and/or chemical properties of the contents of chemical source 112. Additionally, chemical source 112 may include meters, valves, and/or pumps 116 for monitoring and providing the feedstock chemicals to feedstock unit 122 via conduit 120.

Water source 104 is in fluid communication with feedstock unit 122 via conduit 118. Additionally, chemical source 112 is in fluid communication with feedstock unit 122 via conduit 120. Feedstock unit 122 is generally provided for preparing and storing a brine solution, and may include sensors 126 for determining the physical and/or chemical properties of the brine solution produced by combining feedstock chemicals from chemical source 112 and water from water source 104 in feedstock unit 122. Additionally, feedstock unit 122 may include meters, valves, and/or pumps 128 for monitoring and providing the feedstock chemicals to feedstock unit 122 via conduit 120. Feedstock unit 122 is in communication with control unit 102 via communication link 124 for transmitting instructions, information, and data between sensors 126 and meters, valves, and/or pumps 128 of feedstock unit 122 and control unit 102 for controlling the operation of feedstock unit 122.

System 100 may further include one of more electrolytic cell units 132a, 132b, . . . 132n (collectively electrolytic cell units 132). Electrolytic cell units 132 are in fluid communication with feedstock unit 122 via conduits 130a, 130b, . . . 130n, respectively (collectively conduits 130). Electrolytic cell units 132 may include sensors 136a, 136b, . . . 136n, respectively, (collectively sensors 136) for determining the physical and/or chemical properties of the fluids in electrolytic cell units 132. Additionally, electrolytic cell units 132 may include meters, valves, and/or pumps 138a, 138b, . . . 138n, respectively, (collectively meters, valves, and/or pumps 138) for monitoring and providing the fluid flow through electrolytic cell units 132. Electrolytic cell units 132 are used to carry out the electrolytic reactions performed as part of the method of preparing a temper fluid as further described below with reference to FIG. 3. Electrolytic cell units 132 are in communication with control unit 102 via communication links 134a, 134b, . . . 134n, respectively, (collectively communication links 134) for transmitting instructions, information, and data between sensors 136 and meters, valves, and/or pumps 138 of electrolytic cell units 132 and control unit 102 for controlling the operation of electrolytic cell units 132.

As shown in FIG. 1, system 100 may include one or more electrolytic cell units 132. When the system 100 employs multiple electrolytic cell units 132, the electrolytic cell units 132 may be in a parallel arrangement (as shown in FIG. 1), each unit receiving fluid and/or liquid feedstock from feedstock unit 122. In another embodiment (not illustrated), electrolytic cell units 132 may be in series, such that the output of one electrolytic cell unit 132 feeds the input of a subsequent electrolytic cell unit 132.

One or more outputs from electrolytic cell units 132 can be fed to a mixing unit 144 via conduits 140a, 140b, . . . 140n, respectively, (collectively conduits 140) or to a storage unit 154 (conduits from electrolytic cells 132 to storage unit 154 not shown in FIG. 1). As discussed in greater detail below, the electrolytic cell units 132 may have multiple, distinct product streams, with each product stream having a different composition. Depending on the specific product stream and the subsequent method used for producing the temper fluid described herein, each product stream of the electrolytic cell units 132 may be sent to either a mixing unit 144 (e.g., in the case where the product stream is used at the beginning of a method for preparing a temper fluid), or to a storage unit 154 (e.g., in the case where the product stream is not used until later in the method for preparing a temper fluid). Those product streams that are sent to a storage unit 154 may later be sent to a mixing unit 144 as may be required for later steps in the method of preparing a temper fluid.

For simplicity's sake, FIG. 1 illustrate a single mixing unit 144. However, it should be appreciated that the system 100 may include multiple mixing units 144, and that such mixing units may be located at any point throughout the system 100. Each mixing unit 144 may include sensors 148 for determining the physical and/or chemical properties of the fluids in mixing unit 144. Additionally, mixing unit 144 may include meters, valves, and/or pumps 150 for monitoring and providing the fluid flow through mixing unit 144, such as to a a storage unit 154 via conduit 152 as shown in FIG. 1. Mixing unit 144 is in communication with control unit 102 via communication link 146 for transmitting instructions, information, and data between sensors 148 and meters, valves, and/or pumps 150 of mixing unit 144 and control unit 102 for controlling the operation of mixing unit 144.

For simplicity's sake, FIG. 1 illustrate a single storage unit 154. However, it should be appreciated that the system 100 may include multiple storage units 154, and that such storage units may be located at any point throughout the system 100. Each storage unit 154 may include sensors 158 for determining the physical and/or chemical properties of the fluids in storage unit 154. Storage unit 154 may include meters, valves, and/or pumps 160 for monitoring and providing the fluid flow through storage unit 154, such as to an application unit 168 via conduit 162 as shown in FIG. 1. Storage unit 154 is in communication with control unit 102 via communication link 156 for transmitting instructions, information, and data between sensors 158 and meters, valves, and/or pumps 160 of storage unit 154 and control unit 102 for controlling the operation of storage unit 154.

System 100 may further include an application unit 164 that is in fluid communication with any storage unit 154 that is used to store the final temper fluid. Application unit 164 may include sensors 168 for determining the physical and/or chemical properties of the fluids in application unit 164. Application unit 164 may include meters, valves, and/or pumps 170 for monitoring and providing the fluid flow through application unit 164 to an applicator 172. While not shown in FIG. 1, it is also possible for application unit 164 to be in direct fluid communication with a mixing chamber 144, such as in the event that the final temper fluid is produced in a mixing chamber 144 and does not require storage prior to application.

Applicator 172 may include several discharge devices, such as nozzles and the like for applying, spraying, depositing, mixing, coating, etc. temper fluid 174 onto a surface 178 of a material and/or object 176. In some embodiments, the material and/or object 176 is a foodstuff.

Figure 2:
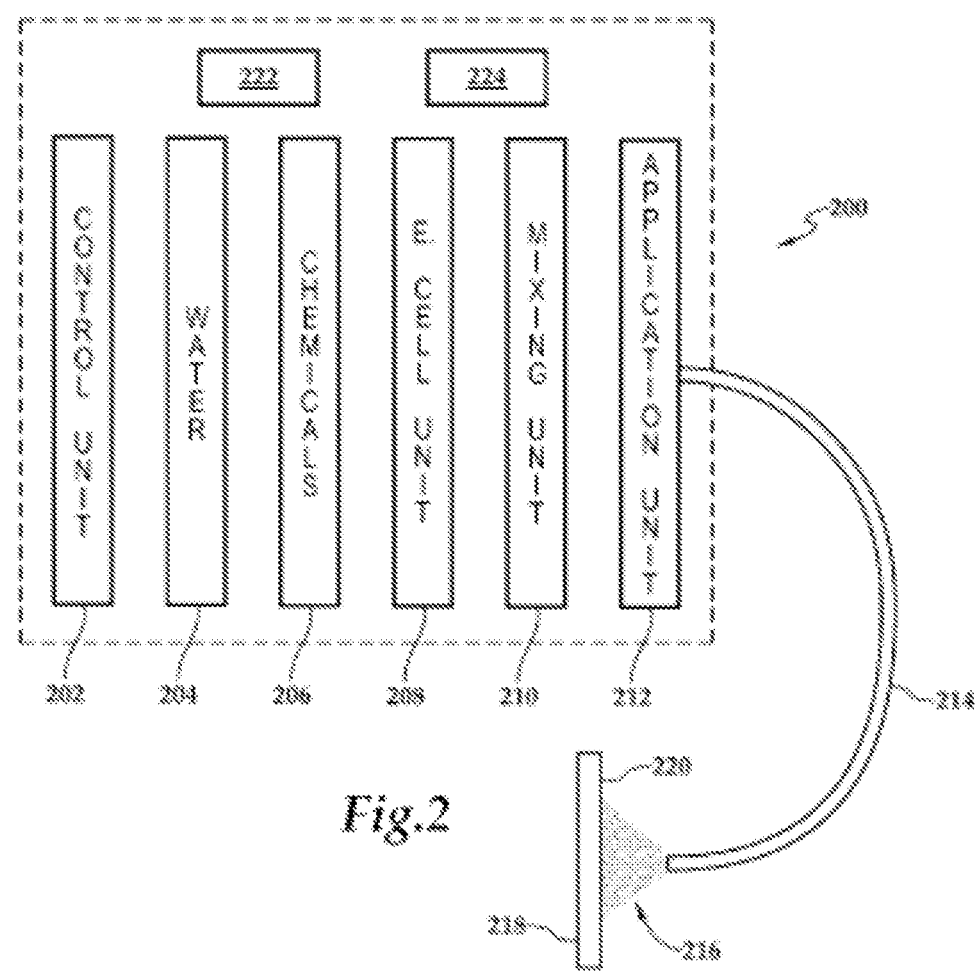
FIG. 2 is a block diagram of a portable electrolytic temper fluid generation system according to various embodiments described herein.

Turning now to FIG. 2, a simplified portable temper fluid generation system is schematically illustrated and generally designated 200. Portable system 200 may be any type of portable platform, such as backpacks, vehicles, trailers, and the like. Portable system 200 includes a control unit 202 that controls the other units in system 200.

Portable system 200 may also include a water source 204 for providing water to combine with a chemical source 206 for producing a brine solution that is fed to an electrolytic cell unit 208. Portable system 200 may also include one or more mixing units 210 for mixing the products from electrolytic cell unit 208 as further described below. Also, portable system 200 may include an application unit 212 that may include an applicator 214 for spraying, applying, depositing, mixing, coating, etc. temper fluid 216 onto a surface 220 of a material and/or object 218.

In some embodiments, portable system 200 may further include a feedstock unit (not shown in FIG. 2) for combining the feedstock chemicals from chemical source 206 and water from water source 204 to provide a specific brine solution to electrolytic cell unit 208. In other embodiments, portable system 200 may not include a feedstock unit, and the brine solution may be mixed dynamically from water source 204 and chemical source 206.

Additionally, portable system 200 may include sensors 222 for determining the physical and/or chemical properties of any or all of water source 204, chemical source 206, electrolytic cell unit 208, mixing unit 210, application unit 212, and applicator 214. Additionally, portable system 200 may include meters, valves and/or pumps 224 for monitoring and pumping water for any or all of water source 204, chemical source 206, electrolytic cell unit 208, mixing unit 210, application unit 212, and applicator 214.

In some embodiments, water sources 104, 204 may be vessels, containers, and the like for storing a supply of water. In other embodiments, water sources 104, 204 may be supplies of water, such as public water supplies, wells, lakes, streams, etc. The physical and chemical properties of water source 104 may be measured or sensed during intake, storage, etc. for determining these properties for composition makeup. Additionally, these properties may be used in defining the extraction objectives and the field parameters. Some of these properties may be fluid total dissolved solids, mineral composition, etc.

In some embodiments, water sources 104, 204 may be portable sources of water that are carried or transported conveniently. They may be pre-filled containers, or containers that are filled at local water supplies and then transported to another location for operating system 100 and portable system 200, for example.

The chemicals and compounds that are stored in chemical sources 112, 206 are preferably any soluble chloride salt. Some exemplary chemicals stored in chemical sources 112, 206 may be sodium chloride, potassium chloride, lithium chloride, rubidium chloride, cesium chloride, ammonium chloride, magnesium chloride, calcium chloride, potassium nitrate, sodium nitrate, sodium phosphate, potassium phosphate, sodium sulfate, potassium sulfate, borate salts, or other applicable salts and the like.

In one embodiment, chemical sources 112, 206 may be substantially dry compounds that are then mixed with water to substantially near the solubility limit of the salt solution. In another embodiment, chemical sources 112, 206 may be substantially dry compounds that are then mixed with water at any limit below their solubility limits. Additionally, a concentrated liquid chemical sources 112, 206 may also be used in these sources.

In general, the feedstock brine solution 1022 (see FIG. 3) may be water, brine, or other fluid substance that can be treated and introduced to alter the electrochemical state of the liquid-solid interface. As described below, the chemical sources 112, 206 are mixed or combined with the water sources 104, 204, respectively, to produce a brine solution of a desired concentration. In one aspect, the brine solution concentration may be from approximately few parts per million ("ppm") to the saturation limit of the carrier fluid feedstock. In one embodiment, feedstock brine solution 1022 may have a concentration of chloride containing compound from about 1 ppm to about 24% w/w based on the total weight of feedstock brine solution 1022. Preferably, feedstock brine solution 1022 may have a concentration of chloride containing compound of from about 0.1% to about 10% w/w based on the total weight of feedstock brine solution 1022. In still yet another embodiment, feedstock brine solution 1022 may have concentration of chloride containing compound of from about 0.2% to about 0.7% w/w based on the total weight of feedstock brine solution 1022.

Generally, feedstock brine solution 1022 may be used at concentrations that vary from a few parts per million to well over 10%, depending on the specific application. The feedstock chemicals or salts are dissolved at specified rates in water to create a brine solution, with or without water filtering, softening, and other pre-treatment to remove unwanted constituents. Additionally, nano-particles (natural or man-made) or other suitable materials can be used or added to feedstock brine solution 1022 to enhance its ability to retain/carry a charge or otherwise enhance the carrying capacity or potential work capacity of the fluids.

As described herein, electrolytic cell units 132, 208 create the initial precursor acids and bases for the generation of the temper fluid formulations. Hydroxides such as NaOH and KOH can be derived from their base salts. The conjugate hypochlorous/hydrochloric acids are also made from these salts. The oxidation/reduction potential ("ORP") of these fluids should be in the range of a few millivolts (mV) to over +/−1150 mV, depending on the chosen device settings, power supplies, applications, and formulary specifications. Electrolytic cell units 132, 208 are used for generating chlorine dioxide, where the chlorite salt (NaClO2 or similar) does not pass through the electrolytic cell units 132, 208. By utilizing the produced fluids in the generation of the temper fluid compositions, the ORP is maintained in the compositions, providing an additional and important cleaning and disinfectant mechanism.

Figure 3:
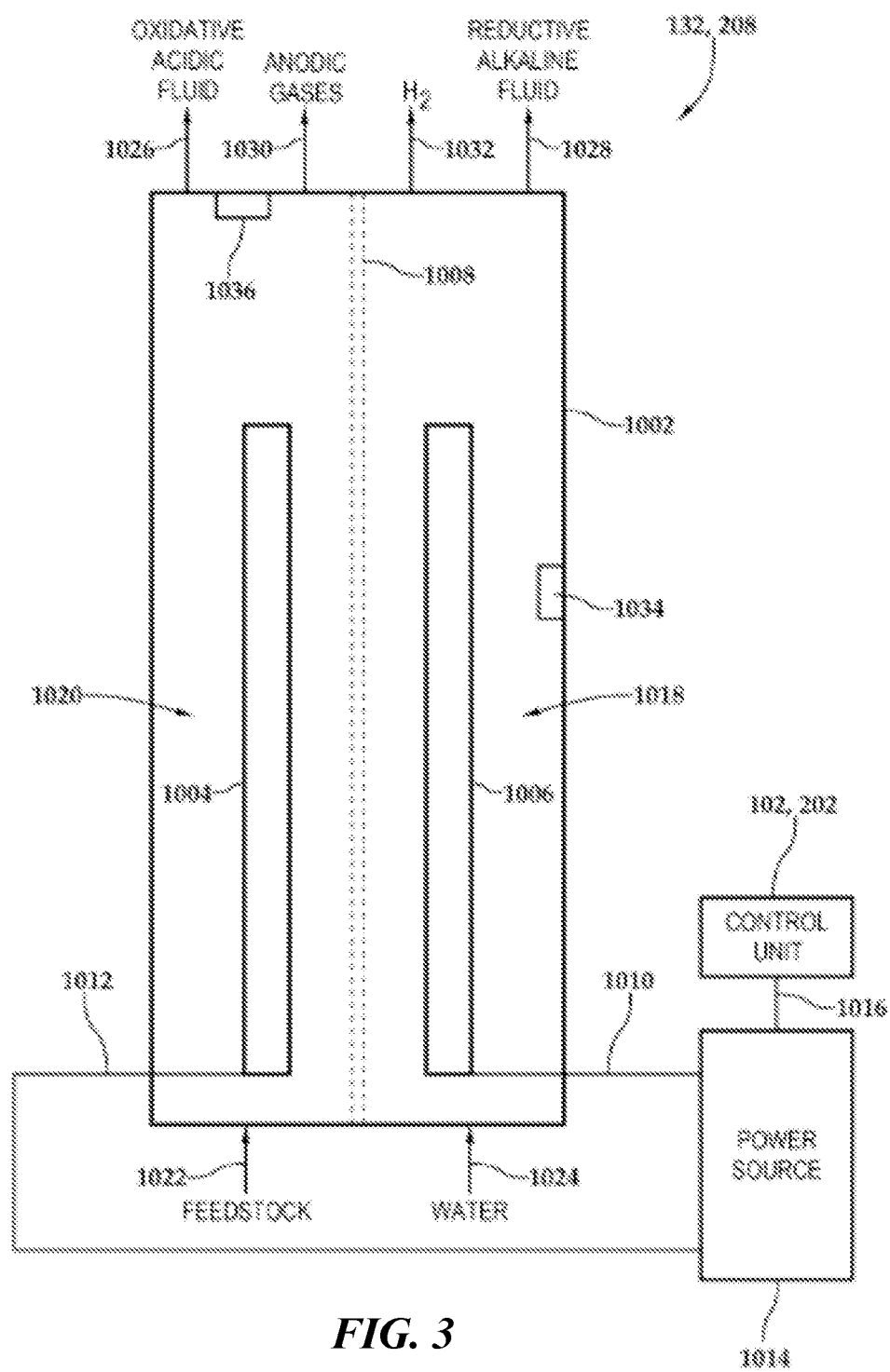
FIG. 3 illustrates a plan view of an electrolytic cell unit according to various embodiments described herein.

In addition, the cell life of electrolytic cell units 132, 208 may be enhanced by, in a certain embodiment, solid state modulation of reactor electricity and polarity for self-cleaning of the surfaces and pores of semi-permeable membrane 1008, anode electrode 1004 and cathode electrode 1006 (see FIG. 3). The modulation of the electrical supply and the acid and alkaline streams may be used to dissolve scale formation in-situ in order to both optimize electrolytic component life and optimize formulary potency.

Additionally, and as described in further detail below, mixing units 144, 210 may further be in fluid communication with supplies of additives for mixing with the product streams from electrolytic cell units 132, 208 and subsequently formed mixtures. The unique additives that are tolerant of the highly oxidative or reductive formulation assist as wetting agents and micelle generators, while reducing corrosion. Although the supply of additives is described herein with reference to mixing units 144, 210, all or any of the other units described herein may also include this or other supplies of additives to be added to the various mixtures produced throughout the method described herein.

Some exemplary additives may include: buffers, surfactants (typically FDA food grade approved surfactants), chelants, wetting agents, micelle generators, detergents, or other enhancing materials. Some additional additives include buffers for buffering the temper fluid to the desired pH, using any of a wide range of buffering materials, such as but not limited to, carbonates, bicarbonates, hydroxides, or similar.

Some of these additives may be surfactants, which may be any compound or combination of compounds that assists in lowering surface tension, increasing wettability, creating micelles or adding detergent effects to the fluid that assists in decontamination applications.

The surfactants may be added at a rate of 0.001% to over several percent depending on specific application. The surfactants typically include FDA and/or EPA approved ethylene oxide-based surfactants such as (but not limited to) DOW's L-61 or BASF's Pluronic or various alcohol ethoxylates, alkyl sulfates and lauroyl sarcosinates. These include but are not limited to Stepan's Bio-Soft series, Ammonyx series, Bio-Terge series, Stepanol series, Air Products Tomodol series, and Croda's Crodasinic LS-30 or similar surfactants that are tolerant of oxidizing and reducing solutions. In most cases, FDA approved and/or EPA certified Design for Environment (DFE) surfactants are preferred, but not required.

The integrated sensors 108, 114, 126, 136, 148, 158, 168, 222 of system 100 and system 200 provide for continuous monitoring of output concentrations within specifications, and notification of operator of any variances in order to assure product quality. Other benefits include totalizing capability on both produced electrolytic streams and on produced compositions and formularies.

Sensors 108, 114, 126, 136, 148, 158, 168, 222 may be the types of sensors that measure physical and/or chemical properties of the respective liquid, gas, and/or fluid in their respective environments. The measurements or data from sensors 108, 114, 126, 136, 148, 158, 168, 222 may be communicated to control units 102, 202 for adjusting any or all of the processes relating to system 100 and system 200, including controlling and adjusting the operation of meters, valves and/or pumps 110, 116, 128, 138, 150, 160, 170, 224.

For example, sensors 108, 114, 126, 136, 148, 158, 168, 222 may measure key composition components, such as the reduction potential, redox potential, oxidation/reduction potential ("ORP") of the carrier fluid and pH and/or conductivity/resistivity of any of the liquids, fluids, and/or gases of any of the units described herein.

ORP generally means a quantitative measure of the energy of oxidation or reduction. Oxidation is equivalent to a net loss of electrons by the substance being oxidized, and reduction is equivalent to a net gain of electrons by the substance being reduced. The oxidation-reduction reaction involves a transfer of electrons. The oxidation-reduction potential may be expressed as the ability to give or receive electrons and is expressed in terms of millivolts (mV) which may be either positive (lack of electrons) or negative (excess of electrons).

In some embodiments, control units 102, 202 analyze the data provided by sensors 108, 114, 126, 136, 148, 158, 168, 222 by utilizing continuous monitoring of calculations, inferences, and/or indirect measurements of electrolytic components from combined values of electrolyte potential (i.e., composition and concentration), reactor current density, produced volume measurement of component gases, and direct liquid or fluid flows. Control units 102, 202 may provide real-time analysis of key parameters, chemical properties, and/or physical properties. This eliminates dependence on human calibrated monitoring devices that are prone to drifting out of specification.

In some embodiments, control units 102, 202 of system 100 and system 200 may use any of the following examples to predict or determine pH values, conductivity and ORP of any of the liquids, fluids, gases, etc. in these systems' units. In one example, control units 102, 202 may intake data from sensors that constantly or continuously monitor flow rates at the inlet and outlets of electrolytic cell units 132, 208. In another example, control units 102, 202 may intake data from sensors that constantly or continuously monitor the electrolyte composition and concentration within electrolytic cell units 132, 208.

In yet another example, control units 102, 202 may intake data from sensors that constantly or continuously monitor electrolyte pressure within electrolytic cell units 132, 208. In still yet another example, control units 102, 202 may intake data from sensors that constantly or continuously monitor the efficient separation of the gas phase from the liquid phase in outlet streams of electrolytic cell units 132, 208. Further, control units 102, 202 may intake data from sensors that constantly or continuously monitor or measure the post-separation gas volumes from electrolytic cell units 132, 208. Also, control units 102, 202 may intake data from sensors or electronics that constantly or continuously monitor or maintain DC voltage and/or current through electrolytic cell units 132, 208.

Referring now to FIG. 3, exemplary electrolytic cell units 132, 208 are shown in further detail. Electrolytic cell units 132, 208 ionize the brine solution or carrier fluid of system 100 and system 200. The generation of an ionized carrier fluid is produced by ionizing the carrier fluid in electrolytic cell units 132, 208. Electrolytic cell units 132, 208 typically include an insulated container, vessel, shell, and/or housing 1002 with a plurality or series of pairs of electrode plates, such as anode electrode 1004 and cathode electrode 1006. In some designs a conducting material may be used for the housing and then doubles as the electrodes. In some embodiments, anode electrode 1004 and cathode electrode 1006 are separated by a permeable or semi-permeable membrane 1008. An electrical potential or voltage is applied to anode electrode 1004 and cathode electrode 1006 via electrical leads 1010 and 1012 while a carrier fluid flows through electrolytic cell units 132, 208. Generally, the electrical potential or voltage is applied by a power source 1014 that is in communication with control units 102, 202 via communication link 1016.

In some embodiments, insulated housing 1002 may have an internal diameter of sufficient size that reduces the turbulence and flow velocity of the mixed gas/liquid phase stream as they flow through electrolytic cell units 132, 208. This provides or allows the buoyant vertical separation of gas and liquid phases with insulated housing 1002. In one embodiment, a capacitive proximity sensor 1034 positioned near the midpoint of the vertical vessel wall detects when the gas volume has grown to reach the sensor's switch point. Once the volume of gas in the vessel has exceeded the threshold level, a controlled valve orifice 1036 is pulse modulated for predetermined amounts of time, normally on the order of milliseconds. The counting of on/off cycles of the orifice valve 1036 (i.e., duration of "on" time) along with pressure measurements within insulated housing 1002 of electrolytic cell units 132, 208 provides for indirect measurement of gas volumes. As the gas compositions may be different between a cathodic chamber or passageway 1018 and an anodic chamber or passageway 1020 sides of electrolytic cell units 132, 208, they are each directed to subsequent reaction positions further downstream.

This system provides for the accurate measurement of gas volumes and maintains consistent component contributions to the staged reactions used in the generation of the electrolytic temper fluid compositions, resulting in more consistent formulary generation through time.

Passageways 1018 and 1020 are created on each side of permeable membrane 1008. Cathode electrode 1006 is disposed within passageway 1018 and anode electrode 1004 is disposed within passageway 1020. The carrier fluid produced by combining water with the feedstock chemicals as further described below produces a feedstock brine solution 1022 that is supplied to passageway 1020 that acts as the conducting medium between anode electrode 1004 and cathode electrode 1006. Additionally, a supply of water 1024 is provided to passageway 1018. The charge across anode electrode 1004 and cathode electrode 1006 causes anions to be attracted to anode electrode 1004 and cations to be attracted to the cathode electrode 1006. Thus, the ionized carrier fluid is oxidized at the anode electrode 1004 producing an oxidative acidic fluid 1026 and the ionized carrier fluid is reduced at the cathode electrode 1006 producing a reductive alkaline fluid 1028. Oxidative acidic fluid 1026 in passageway 1020 is oxidized and reductive alkaline fluid 1028 in passageway 1018 is reduced. Additionally, anodic gases 1030 are produced in passageway 1020 and are also exited out of electrolytic cell units 132, 208. Hydrogen gas 1032 is also generated in passageway 1018 and is also exited out of electrolytic cell units 132, 208. A basic ionizer may also be constructed by using simple containers (like tanks) with an electrode in each container and linked with a conduit separated by a membrane. In this "batch" approach a flowing fluid may not be necessary.

In general, electrolytic cell units 132, 208 have inlets (not shown) disposed in their bodies or housings for accepting the inputs or inlets of feedstock brine solution 1022 and water 1024. Further, electrolytic cell units 132, 208 have outlets (not shown) disposed in their bodies of housings for accepting the outputs or outlets of oxidative acidic fluid 1026, reductive alkaline fluid 1028, and anodic gases 1030, for example.

Permeable membrane 1008 may be any type of membrane that facilitates the flow of certain ions through the membrane as is commonly known to those skilled in the arts of electrolytic cells. In one embodiment, permeable membrane 1008 may be an AGC, Inc. Femion type membranes or a GoreTex® SGT100120-1 (or similar) membrane material for ion transfer therethrough.

In one embodiment, control units 102, 202 of system 100 and system 200 operate with a dynamic process instrumentation diagram ("PID")-loop control of each component stream flow, dynamic trim adjustments are made to individual stream controls to maintain formula proportions. In addition, coiled or serpentine-routed tubes of a calculated diameter and length, as well as expansion chambers and/or vessels of significantly larger cross-sectional diameter and internal volume, may be used to obtain engineered reaction resonance required for the optimization of the described electrolytic chlorine dioxide biocide composition steps.

The ionization of feedstock brine solution 1022 that is saline (or other fluid with appropriate TDS) changes the fluid ionic composition on both sides of permeable membrane 1008. For example, as feedstock brine solution 1022 passes through electrolytic cell units 132, 208, it undergoes a partial disassociation of both the water (HOH) component and salt (NaCl) component, for example, of the carrier fluid, with ions migrating through permeable membrane 1008 to the opposite charged side where re-association will occur. For example, in passageway 1018 of permeable membrane 1008, sodium ions ($Na^+$) and hydroxyl ions ($OH^-$) will re-associate to form sodium hydroxide, NaOH, commonly known as the "alkaline" side to produce reductive alkaline fluid 1028. On the opposite charged side, passageway 1020, hydrogen ions ($H^+$) will re-associate with chlorine ($Cl^-$) and form hydrochloric acid, HCl or more typically hypochlorous acid, HOCl, and is often known as the "acidic" or astringent side to produce oxidative acidic fluid 1026. Other compounds or combinations of compounds are used to attain the same goals using this approach.

Both ionized materials will also have a significant "shift" in their respective redox potential from the initial state of the carrier fluid as the carrier fluid is adjusted to a different ionic state. The alkaline side will have a dramatic increase in excess electrons and become a powerful reducing agent. The opposite is true for the acidic side, which is deficient in electrons and is thus a powerful oxidizer. These shifts in redox potential can be well in excess of +/−1150 mV as measured by ORP. This limit can be as high as where the carrier fluid completely disassociates and will not carry any additional charge, or is no longer useful to the process. Alternatively, any measurable change in redox may be sufficient to produce desirable results. This measurement can be made by a simple pH/ORP meter or sensor or more sophisticated data logging can be achieved by using a continuous flow through design, such as with inline pH/ORP/conductivity analyzers.

Some of the variables that control the magnitude of the electrolytic process are the flow rate of the carrier fluid through insulated housing 1002, the charge potential between anode electrode 1004 and cathode electrode 1006, the carrier fluid residence time, and the voltage and amperage used to ionize the carrier fluid. According to process designs, variables such as voltage and amperage applied to anode electrode 1004 and cathode electrode 1006, flow rate through passageway 1018 and passageway 1020, and/or brine concentration of feedstock brine solution 1022 may be optimized to produce specific formulary requirements.

Also, permeable membrane 1008 could potentially be moveable between each pair or plurality of anode electrode 1004 and cathode electrode 1006. Permeable membrane 1008 may be located closer to one electrode than the other electrode to create a larger volume of one species of precursor fluids or solutions. In one aspect, permeable membrane 1008 could be located closer to the anode electrode 1004, thereby creating a greater volume of electrolytic precursor alkaline fluids to be produced. In another aspect, permeable membrane 1008 can be moved closer to one electrode to produce one species of ionized precursor fluid, such as electrolytic acidic fluids, and then later moved closer to the other electrode to produce another species of ionized precursor fluid.

In one embodiment, feedstock brine solution 1022 may be passed through electrolytic cell units 132, 208, which are split electrolytic cells that are operated at a substantially low pressure, such as from about 5 to about 90 pounds per square inch ("psi"). In another aspect, the operating pressure within electrolytic cell units 132, 208, may be from about 12 to about 65 psi.

System 100 and system 200 may also include other configurations of an ionization apparatus that could include systems using simple electrolysis with or without a membrane (e.g., ported systems or other configuration), variations in plate materials/configurations or any other embodiment that is able to produce an ionized fluid adequate to generate beneficial results during the decontamination process.

In some embodiments, electrolytic cell units 132, 208 may be powered by direct current ("DC") power supply produced by converting alternating current ("AC") power supply to DC with transformers, rectifiers, capacitors, regulators, etc. for example. For example, a 120 voltage alternating current ("VAC") supply may be connected with a transformer that converts the power supply to voltage direct current ("VDC"), which may be adjusted or modulated to provide the desired voltage output at power source 1014 for providing the desired voltage and current through electrical leads 1010 and 1012. In another aspect, electrolytic cell units 132, 208 may be powered by a portable or non-portable DC power supply. For example, portable system 200 may include a battery and/or battery pack that is or provides power source 1014 with the desired voltage and current to electrical leads 1010 and 1012. In some embodiments, integral control and monitoring of the current density at electrolytic cell units 132, 208 may be accomplished via solid state engagement and modulation of the electrical supply powering electrolytic cell units 132, 208, such as power source 1014. This may prevent arcing electrical leads 1010 and 1012 while providing control over the electrical supply, resulting in enhanced safety and more consistent formula generation. In some embodiments, power source 1014 provides a VDC of from about 7 to about 15 VDC. In other embodiments, the voltage may be between 15 and 50 VDC.

In addition, control units 102, 202 of system 100 and system 200 may provide continuous and automated control and monitoring of composition component proportions inputted and outputted from electrolytic cell units 132, 208, including gas and liquid phases, in order to optimize and standardize the properties of the generated electrolytic chlorine dioxide biocides.

Further, control units 102, 202 of system 100 and system 200 may provide the continuous and automatic control of reaction resonance times and of the mixing of the formula components through electrolytic cell units 132, 208, and in certain embodiments via engineered turbulence flow paths extended over calculated lengths within electrolytic cell units 132, 208. By controlling the steps described above in this way, the properties of the generated electrolytic temper fluid are both optimized and consistent.

Moreover, control units 102, 202 of system 100 and system 200 may provide enhanced ability for monitoring of key system, sub-system, or unit processes to ensure continuous, top quality compositions of electrolytic temper fluids are achieved. In a certain embodiment, this will allow for remote monitoring of processes and self-diagnostics to maximize electrolytic efficiencies and minimize production interruptions.

Figure 4:
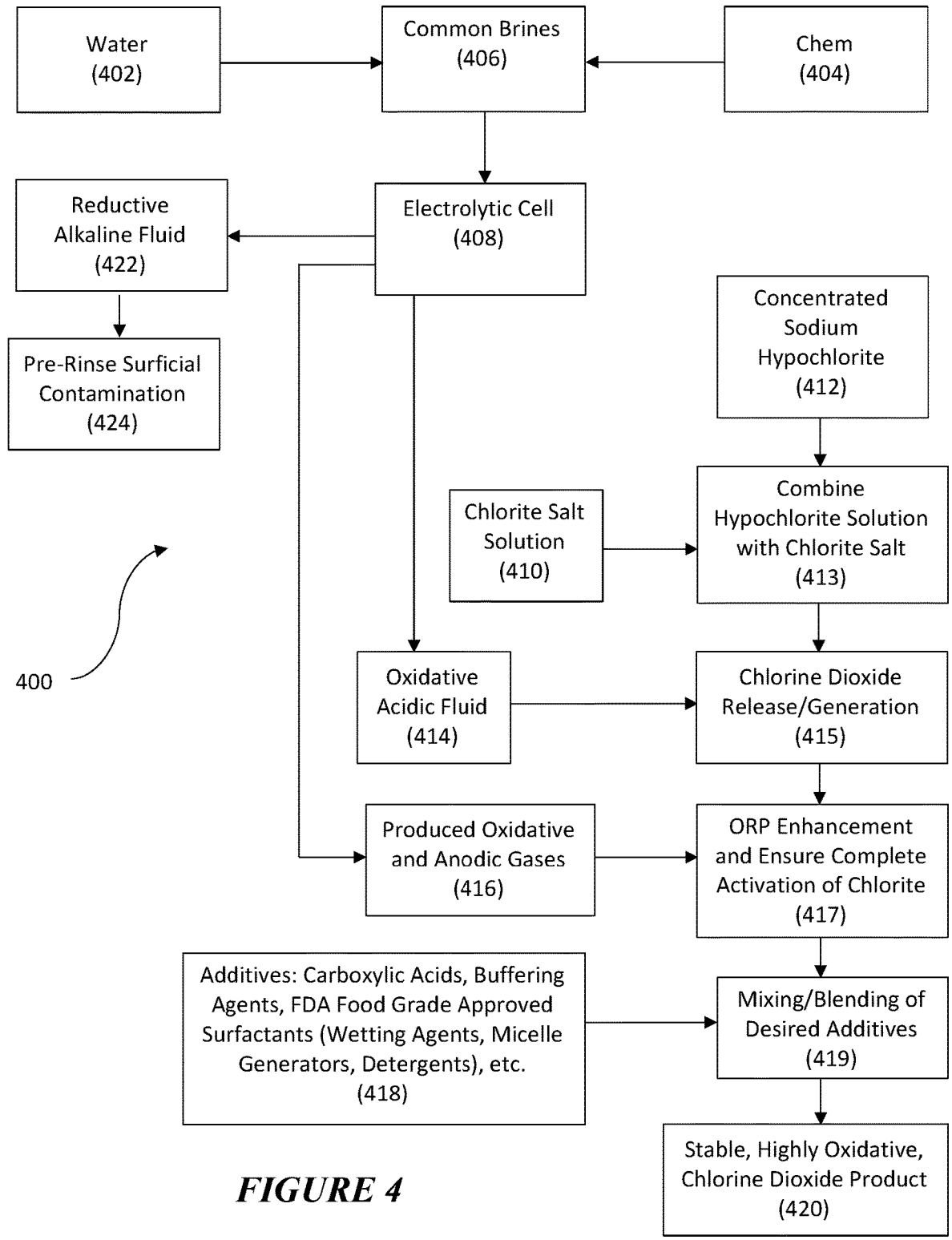
FIG. 4 illustrates a flow chart of an electrolytic temper fluid generation system according to various embodiments described herein.

With reference now to FIG. 4, a method for making electrolytic temper fluid is schematically illustrated and generally designated 400. Initially, a brine solution 406 is produced by mixing feedstock chemicals from a chemical source 404 with water provided from a water source 402. This step may include loading an amount of water into water source 402 or connecting water source 402 to a source of water, such as a public utility, lake, vessel, and the like. Water source 402 may also be purified water. Additionally, this step may include loading the desired chemical into chemical source 404. In some embodiments, the chemical in chemical source 404 is a salt, such as NaCl, KCl, etc. The two sources 402, 404 are mixed together to produce a basic brine solution 406.

Next, basic brine solution 406 is fed into one or more electrolytic cell units 408, which are used to generate oxidative acidic fluid 414, reductive alkaline fluid 422, and oxidative and anodic gases 416 as described in greater detail above with respect to FIG. 3.

In this step, electrolytic cell units 408 may be optimally slow-started via low pulse-width modulation ("PWM") duty cycle and ramped up to allow electrical flow-inhibiting gas bubbles evolved from the electrolyte at the surfaces of anode electrode and cathode electrode to form and reach their steady-state level. This prevents startup conditions in which the power requirements are momentarily significantly higher than during all other operating conditions. Net potential/voltage at anode electrode and cathode electrode may be maintained as a constant through dynamic control of PWM duty cycle. A solid-state H-Bridge can be utilized to modulate power and polarity for periodic de-scaling and cleaning of electrolytic cell units 408 components.

Next, the generated oxidative acidic fluid 414, reductive alkaline fluid 422, and anodic gases 416 are recovered from electrolytic cell units 408. The generated oxidative acidic fluid 416 may have a pH between about 1.5 and 4.5 and an oxidative (electron deficient or +mV) potential.

In some embodiments, the reductive alkaline fluid 422 may be used as a pre-rinse 424 on the grain material to be treated using the temper fluid prepared in accordance with the methods described herein. The reductive alkaline fluid 422 generally comprises common hydroxides (e.g., NaOH, KOH). By subjecting the grain material to a pre-rinse 424 using the reductive alkaline fluid 422, surficial contamination present on the grain may be removed therefrom. Surficial contamination that may be removed from this pre-rinse step includes, but is not limited to, dust, fungal spores, bacteria and glyphosate. Remaining fungal spores, bacteria and glyphosate are also impacted from the sudden alkaline pH shift that occurs upon carrying out the pre-rinse step. For example, most grain material is slightly acidic (e.g., 4.5 to 5+pH) and the pH shift to ~11+ alone helps to degrade/kill microbes and glyphosate that are tolerant of the slightly acidic pH. The addition of food-safe surfactants as described above can enhance the alkaline pre-rinse effectiveness.

Any manner of washing the grain with the reductive alkaline fluid 422 as part of pre-rinse 424 may be used, including continuous or batch processes. When combining the reductive alkaline fluid 422 with the grain material, agitation may optionally be used to promote removal of surficial contamination from the grain material. This pre-rinse step can be carried out at any time prior to washing the grain material with the chlorine dioxide product produced by the method described herein and discussed in further detail below.

The pre-rinse step may also be optionally combined with or preceded by mechanical washing of the grain material. Mechanical cleaning applications can remove unwanted organic compounds that may have bacteria counts attached, such as dust, coarse impurities, stones, fine particles, husk and light particles. Exemplary, though non-limiting, mechanical cleaning applications include: abrasion equipment; scourers; aspirators; peeling; pearling; separators; destoning; enoleters; indented cylinders and sieves. Mechanical cleaning applications can also be performed after the pre-rinse 424 but prior to combining the temper fluid with the grain material.

Regardless of whether/when a pre-rinse 424 is carried out, the process of preparing the temper fluid may proceed by combining a sodium hypochlorite solution 412 with a chlorite salt solution 410 to provide a first composition 413 including the hypochlorite solution and the chlorite salt.

The source of the hypochlorite solution 412 is generally not limited. Similarly, the source of the chlorite salt solution 410 is generally not limited. In some embodiments, neither the hypochlorite solution 412 nor the chlorite salt solution 410 is produced by the method described herein. That is to say, neither chlorite salt nor hypochlorite is produced as a product or byproduct of any of the steps described herein. Instead, the hypochlorite and the chlorite salt may be provided from a separate source distinct from the method described herein, such as a source of stock hypochlorite solution and chlorite salt.

In some embodiments, the hypochlorite solution and the chlorite salt solution are combined at a ratio such that a subsequently produced final temper fluid (described in greater detail below) will have a chlorine dioxide concentration of 500-1000 ppm and an ORP of between +500 my to +1100 mv, such as between +800 my and +1100 mv. The ratio selected should also minimize any undesirable residuals from the reaction to <2 ppm.

The first composition 413 is then combined with the oxidative acidic solution 414 to form a second composition 415. Oxidative acidic fluid 414 may include, e.g., hydrochloric/hypochlorous acids (HCl, HOCl). The oxidative acidic fluid 414 and first composition 413 can be combined using any suitable methods, such as mixing the two components in a reaction vessel or via a flow through continuous mixing approach. This step results in releasing chlorine dioxide to thereby provide a first composition 415 including chlorine dioxide. This step can also result in bringing the pH of the composition 415 from about 8 to in the range of 2 to 5.

The released chlorine dioxide solution 415 is then combined with anodic gases 416 to enhance create a preliminary temper fluid 417 having the ORP value to well in excess of +800 mV. The reaction of the combined anodic gases with the second composition 415 helps ensure a more complete reaction and would minimize any undesirable residuals to <2 ppm.

As shown in FIG. 4, the anodic gases 416 (e.g., chlorine, oxygen, ozone, etc.) are produced by the electrolytic cell units 408 and are used to enhance the second composition 415. More specifically, combining the anodic gas 416 with second composition 415 results in shifting the ORP of the resultant solution 417 to within a range of from about +500 my to about +1100 mv.

Any manner of combining the second composition 415 and the anodic gas 416 may be used. In some embodiments, the anodic gases 416 are bubbled through the second composition 415 in order to combine the two materials.

In some embodiments, the chlorine species of the anodic gas 410 are captured by the excess of hydroxide (e.g., up to 10%) in the second composition 415, making the resultant composition 417 more potent. This step also eliminates any discharge of chlorine species later in the process, and thus eliminates a potential regulatory issue. The combination of the anodic gas 416 and the second composition 415 also shifts the pH more acidic, allowing the electrolytic cell units 408 to operate at a lower power setting, thus improving efficiency and longevity. The ozone component of anodic gas 416 is mostly captured and, along with the oxygen component of the anodic gas 416, transfers the oxidation enhancement and minimizes undesired residuals shift to the preliminary temper fluid 417. This again improves efficiency via conservation of energy.

After production of the preliminary temper fluid 417, various additives 418 may be mixed into the highly oxidative chlorine dioxide product, such as in a mixing vessel 419. These additives must be tolerant of the oxidative environment without degradation of the formulation. These additives may include: carboxylic acids and other acids; buffers; surfactants including food grade surfactants (wetting agents, micelle generators, detergents); among other additives.

When buffering agents are used, the buffering agent can bring the chlorine dioxide composition to near neutral (such as to a pH of from about 5 to about 8). A wide range of buffers may be used at this step, such as potassium/sodium carbonate or similar compounds. Once buffered, pH sensitive surfactants may be added to the chlorine dioxide composition. These include oxidative solution-tolerant surfactants that do not destroy the solution's ORP or cause any other adverse reactions. Surfactant additives may include typically include FDA and/or EPA-approved ethylene oxide-based surfactants, such as (but not limited to) DOW's L-61 or BASF's Pluronic or various alcohol ethoxylates, alkyl sulfates, among numerous others. In some embodiments, surfactants are used in the 0.05 to 2.0% range. The alcohol ethoxylates (such as Stepan's Bio-Soft series) can be used to enhance wetting properties, while alkyl sulfates such as the Stepanol ME-Dry series can be included if micelle generation or enhanced cleaning properties are desired. If corrosion is a major concern, Croda's LS-30 surfactant can be added to the formulation to act as a corrosion inhibitor (with or without other surfactant combinations). This description is provided as an example only, and other DFE and traditional surfactants may be used to create a chlorine dioxide composition with desired properties.

In some embodiments, a common surfactant load combination is 0.2% of Stepan's Bio-Soft series to enhance wetting combined with 0.2% alkyl sulfates such as Stepanol ME-Dry for micelle generation.

Other additives that may be considered for addition to the chlorine dioxide solution include dispersants, agglomerants, flocculants, chelants and nano-particles.

In some preferred embodiments, at least one carboxylic acid is added to the chlorine dioxide solution. Exemplary though non-limiting carboxylic acids include: acetic acid, formic acid, lactic acid, propionic acid, 3-hydroxypropionic acid, butyric acid, gluconic acid, itaconic acid, citric acid, succinic acid, 3-hydroxypropionic acid, fumaric acid, maleic acid, and levulinic acid. Carboxylic acid can be added to the chlorine dioxide solution in a range of from about 0.05 to about 2%. Addition of a carboxylic acid enhances the overall fluid characteristics by means of lengthening the activation time of the fluid to eight hours. Regrowth of certain microorganisms have been noted inside the temper bin, therefore lengthening the activation time of the fluid may be beneficial in such scenarios.

Following addition of additives 418, a stable, highly oxidative chlorine dioxide product 420 is formed. This chlorine dioxide product 420 serves as the final temper fluid. The temper fluid 420 may be stored or containerized as desired. Alternatively, temper fluid 420 may be directly applied to wheat material and other foodstuffs as described herein.

While not shown in FIG. 4, a variation on method 400 may include adding the anodic gas to the hypochlorite solution first, then adding the chlorite salt, then adding the oxidative acidic fluid, and finally optionally adding additives in order to prepare the temper fluid.

When applying the temper fluid 420 described herein and produced via method 400 shown in FIG. 4, the temper fluid is generally added to the grain material, followed by a rest period in tempering bins until the added temper fluid penetrates the kernel and reaches the optimum moisture distribution which helps to prepare the wheat or grains for optimal processing or milling.

Any device or equipment suitable for adding moisture to grains as a conditioning or treatment process to maintain moisture standardization can be used for applying the temper fluid to the grain material. Exemplary processes include but are not limited to equipment application methods of: vibratory mixers; auger screw with moisture and/or steam; washing equipment with moisture and/or steam; atomizing equipment; coating applicators; mixing conveyors; vibratory conveyors; rotary dampeners, and technovators.

In some embodiments, the addition of the electrolytic temper fluid to grain and other foodstuffs is also used to significantly lower the amount of adhered glyphosate and neonicotinoid or neonic containing pesticides, including but not limited to: amiprid, clothianidin, dinotefuran, imidacloprid, thiacloprid, and thiamethoxam.

In some embodiments, the ratio of electrolytic temper fluid to grain is 1-part electrolytic temper fluid to 70 parts grain; 1-part electrolytic temper fluid to 65 parts grain; 1-part electrolytic temper fluid to 50 parts grain; 1-part electrolytic temper fluid to 45 parts grain; 1-part electrolytic temper fluid to 40 parts grain; 1-part electrolytic temper fluid to 35 parts grain; 1-part electrolytic temper fluid to 30 parts grain; 1-part electrolytic temper fluid to 25 parts grain; 1-part electrolytic temper fluid to 20 parts grain; 1-part electrolytic temper fluid to 15 parts grain; 1 part electrolytic temper fluid to 10 parts grain; 1 part electrolytic temper fluid to 5 parts grain; 1 part electrolytic temper fluid to 1 part grain. Higher or lower ratios of electrolytic temper fluid may be used but may interfere with moisture requirements of the milling process.

While described herein primarily in the context of treating grain material, it should be appreciated that the methods described herein can also be applied to other foodstuffs. For example, processes described herein apply to the tempering or treating of all cereal grains including but not limited to; amaranth, barley, buckwheat, bulgur, corn, einkorn, farro, freekeh, Khorasan, millet, oats, quinoa, brown rice, rye, Sorghum, spelt, teff, wheat, and wild rice. The temper fluid described herein may also be applied to treat seeds, leafy greens, various vegetables (e.g., onions, carrots, peas, etc.) fruits or most any applicable raw agricultural products.

Various embodiments of the methods described herein may result in a multi-log reduction of bacteria such as *Salmonella, E. coli, Listeria*, and others, as well as various molds and yeasts. Additionally, a significant reduction of pesticide residue can simultaneously be achieved by reducing glyphosate and various other residues, including neonicotinoid pesticides. Additionally, embodiments of the processes described herein do not create any halogenated organic byproducts that are commonly created with chlorine, hypochlorous acid or various hypochlorite formulas. Embodiments of the methods described herein also minimize undesirable residuals from the reaction.

In these embodiments, the electrolytic temper fluid may have a 99.9-99.999 percent reduction in certain pathogens which includes a reduction of bacteria such as *Salmonella, E. coli, Listeria*, and others as well as various molds and yeasts (fungal) including *Fusarium* species as several are problematic in the tempering of grains.

EXAMPLES

Temper Testing Data Examples—Lab Tests

Example 1

*Salmonella enterica* on wheat samples, applied temper solution at 752-802 ppm.

TABLE 1

| Run | Replicate | Starting CFU/g | Wheat to Fluid Ratio | Result CFU/g | Percent Reduction | Log Reduction |
|---|---|---|---|---|---|---|
| 1 | 1 | 270,000 | 15:1 | 30 | 99.99% | 4.0-log |
| 1 | 2 | 260,000 | 15:1 | 50 | 99.98% | 3.7-log |
| 2 | 1 | 80,000 | 15:1 | <10 | 99.994% | 4.3-log |
| 2 | 2 | 310,000 | 15:1 | 50 | 99.98% | 3.7-log |
| 3 | 1 | 300,000 | 15:1 | 40 | 99.99% | 4.0-log |
| 3 | 2 | 250,000 | 15:1 | 10 | 99.996% | 4.5-log |

Example 2

*Escherichia coli* on wheat samples, applied temper solution at 746-798 ppm

TABLE 2

| Run | Replicate | Starting CFU/g | Wheat to Fluid Ratio | Result CFU/g | Percent Reduction | Log Reduction |
|---|---|---|---|---|---|---|
| 1 | 1 | 240,000 | 15:1 | 10 | 99.996% | 4.5-log |
| 1 | 2 | 170,000 | 15:1 | 20 | 99.99% | 4.0-log |
| 2 | 1 | 210,000 | 15:1 | 10 | 99.99% | 4.0-log |
| 2 | 2 | 160,000 | 15:1 | 40 | 99.98% | 3.7-log |
| 3 | 1 | 30,000 | 15:1 | 10 | 99.97% | 3.6-log |
| 3 | 2 | 160,000 | 15:1 | 30 | 99.98% | 3.7-log |
| 4 | 1 | 170,000 | 100 | 20:1 | 99.94% | 3.3-log |
| 4 | 2 | 150,000 | 70 | 20:1 | 99.95% | 3.4-log |

Example 3

*Enterococcus faecium* (surrogate for *Salmonella*) on wheat, comparison of legacy hypochlorite solution with disclosed temper fluid at ~200-~400 ppm concentration, after temper and 16-hour swell time.

TABLE 3

| Replicate | Solution | Starting CFU/g | Result CFU/g | Percent Reduction | Log Reduction |
|---|---|---|---|---|---|
| 1 | Legacy hypochlorite solution, 260 ppm | $4.2 \times 10^7$ | $8.85 \times 10^7$ | (−110.7%) | NA |
| 2 | Disclosed temper solution, 408 ppm | $4.2 \times 10^7$ | 160,000 | 99.62% | 2.5-log |
| 3 | Disclosed temper solution, 210 ppm | $4.2 \times 10^7$ | 78,500 | 99.81% | 2.7-log |

Temper Testing Data Examples—Mill Validation Tests

Example 4—Evaluating the Efficacy of Chlorine Dioxide Temper Solution in Wheat Kernels Against Generic *E. coli*, a Surrogate of Shiga-Toxin Producing *Escherichia coli* (STEC)

A process validation was conducted to validate the efficacy of the temper solution described herein at an application ratio of 18:1, wheat to temper solution, against *E. coli* ATCC BAA-1427 during wheat processing.

After being cleaned, wheat kernels were subjected to a tempering process in which an application of the temper solution was applied to wheat kernels using a temper screw conveyor. After tempering treatment, tempered wheat was transferred to "Temper Holding Bins" and was stored for a certain period of time (e.g., 4 h) at a certain temperature before going through the rest of the process.

Product Inoculation—One kilogram of product portions was weighed out from 50 kg (110 lbs.) wheat kernels into sterile bags. The inoculum culture (25 mL, ca. 107 CFU/mL) was added into each bag and mixed with the temper solution for about 3-5 minutes until homogenous. The inoculated product remained at room temperature (22-25° C.) for at least 1 hour before being shipped to the validation facility at refrigerated temperature. The validation facility stored the inoculated product at refrigeration temperature upon receipt. The 50 bags of inoculated product were transferred into a bin and mixed well to obtain a homogenous mixture prior to processing. The results of this testing are shown in FIG. 5.

Results—The initial inoculation level of *E. coli* was 6.49 log CFU/g with a range of 6.15 log CFU/g to 6.84 log CFU/g. After treatment with Chlorine Dioxide Temper Solution, there was an average level of 2.71 log CFU/g *E. coli* before the swell bin with a range of 2.41 log 10 CFU/g to 3.26 log CFU/g. After the swell bin, there was an average level of 2.58 log CFU/g *E. coli* with a range of 1.48 log CFU/g to 3.15 log CFU/g.

After treatment with Chlorine Dioxide Temper Solution, the average reductions of *E. coli* were 3.76 (±0.26) log CFU/g before the swell bin, and 3.88 (±0.40) log CFU/g after the swell bin.

Example 5—Evaluating the Efficacy of Chlorine Dioxide Temper Solution Against *E. faecium* NRRL B-2364, a Surrogate of *Salmonella*, in Wheat Kernels A process validation study was conducted for Panhandle Milling Brands (PHM), LLC to validate the lethality of Chlorine Dioxide Temper Solutions against *E. faecium* NRRL-B-2354 during wheat processing.

After being cleaned, wheat kernels were subjected to a tempering process in which an application of the temper solution was applied to wheat kernels using a temper screw conveyor. After tempering treatment, tempered wheat was transferred to "Temper Holding Bins" and was stored for a certain period of time (e.g., 4 h) at a certain temperature before going through the rest of the process.

Product inoculation—One kilogram of product was weighed out from 50 kg (110 lbs.) wheat kernels into 50 sterile bags. The inoculum culture (25 mL, ca. 109 CFU/mL) was added into each bag and mixed with the product for about 3-5 minutes until homogenous inoculation is obtained. The inoculated product rested at room temperature (22-25° C.) for at least 1 hour before being shipped to the validation facility at refrigerated temperature. The validation facility stored the inoculated product at refrigeration temperature upon receipt. The inoculated product in all 50 bags (per microorganism) was transferred into a bin and mixed well to obtain homogenous inoculated product prior to processing. The results of this testing are shown in FIGS. 6A and 6B.

Results—The initial inoculation level of *E. faecium* was 7.19 log CFU/g with a range of 6.86 log CFU/g to 7.82 log CFU/g. After treatment with Chlorine Dioxide (Guardian) Solution, there was an average level of 5.29 log CFU/g *E. faecium* before the swell bin with a range of 4.95 log 10 CFU/g to 6.23 log CFU/g. After the swell bin, there was an average level of 3.93 log CFU/g *E. faecium* with a range of 3.38 log CFU/g to 4.73 log CFU/g.

After treatment with Chlorine Dioxide (Guardian) Solution, the average reductions of *E. faecium* were 1.90 (±0.36) log CFU/g before the swell bin, and 3.26 (±0.33) log CFU/g after the swell bin. In conclusion, treatment with Chlorine Dioxide (Guardian) Solution against *E. faecium* on wheat kernels was successful in achieving a 2 log reduction after 4 h in the swell bin.

Example 6

The temper solution as described herein was added to wheat that was heavily contaminated with glyphosate. Upon treatment with the temper solution, the amount of glyphosate was decreased from an average concentration of 22.02 ppm to 6.93 ppm, resulting in a reduction of 68.53%. Samples of field collected wheat contaminated with glyphosate were successfully treated at ratios of 1:10 and 1:5 with average reductions of glyphosate of 77.83% and 99.11% respectively. Results are shown in Table 4.

TABLE 4

| Glyphosate Reduction | | |
|---|---|---|
| Sample | PPM | Avg Reduction |
| Glyphosate Control 6 samples | 0.1317 | N/A |
| Glyphosate Test 1 6 samples 1:10 | 0.0292 | 77.83% |
| Glyphosate Test 2 6 samples 1:5 | <0.00750 | >99.11% |

Example 7—Treated Grain Functionality Testing

After temper solution treatment and milling into flour, tests were conducted to ensure the quality of the flour was not compromised by treatment with the temper solution. Third party testing was conducted for the following:

Temper solution treated flour was compared with untreated flour across baking categories including pan bread, cakes, cookies, and muffins. All products underwent a sensory review focused on degree of difference between control and test sample product. Although some variance may be observed in several of the tests these variances did not hurt the overall quality of the baked goods.

The testing concluded that most consumers would not see enough of a difference in color of the flour or texture of the baked goods to have concerns.

Yeasted Doughs: No appreciable change in the performance of either flour from original testing in White LEAN pan bread was detected.

Quick Breads: Treated flour produces darker/gray cast in both crust and crumb in muffins, and also slightly more volume.

Cakes: While significant variance between control and test in the first test of a foam cake was observed, this improvement variance was not seen in subsequent tests.

Cookies: No difference in spread, thickness, or texture was observed. Test cookie may be slightly more caramelized on top surface and may be slightly more foxy red on bottom surface.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A method of producing an electrolytic temper fluid, comprising:
   combining a chlorite salt solution with a sodium hypochlorite solution to thereby provide a first composition;
   following preparation of the first composition, combining an oxidative acidic fluid with the first composition to thereby provide a second composition; and
   following preparation of the second composition, combining an anodic gas with the second composition to thereby provide an electrolytic temper fluid.

2. The method of claim 1, wherein the anodic gas and the oxidative acid fluid are both produced by passing a brine through an electrolytic cell.

3. The method of claim 1, wherein the anodic gas comprises one or more of chlorine, oxygen and ozone.

4. The method of claim 1, wherein combining the anodic gas with the second composition produces an electrolytic temper fluid having an ORP in the range of from about +500 mv to about +1100 mv.

5. The method of claim 1, wherein the oxidative acidic fluid comprises hydrochloric acid, hypochlorous acid, or a combination of both.

6. The method of claim 1, wherein the temper fluid has a chlorine dioxide concentration of about 500 to about 1000 ppm.

7. The method of claim 6, wherein the temper fluid has an ORP in the range of from about +800 mv to about +1100 mv.

8. The method of claim 1, further comprising:
   combining the temper fluid with an additive, wherein the additive includes one or more of: a carboxylic acid, a buffering agent, and a surfactant.

9. The method of claim 8, wherein a carboxylic acid is combined with the temper fluid.

10. The method of claim 9, wherein the carboxylic acid is selected from the group consisting of: acetic acid, formic acid, lactic acid, propionic acid, 3-hydroxypropionic acid, butyric acid, gluconic acid, itaconic acid, citric acid, succinic acid, 3-hydroxypropionic acid, fumaric acid, maleic acid, and levulinic acid.

11. A method of treating a foodstuff to remove pathogens and/or pesticides therefrom, the method comprising:
   combining a chlorite salt solution with a sodium hypochlorite solution to thereby provide a first composition;
   following preparation of the first composition, combining an oxidative acidic fluid with the first composition to thereby provide a second composition; and
   following preparation of the second composition, combining an anodic gas with the second composition to thereby provide an electrolytic temper fluid; and following preparation of the electrolytic temper fluid, combining the electrolytic temper fluid with the foodstuff.

12. The method of claim 11, wherein the electrolytic temper fluid and the foodstuff are combined at a ratio in the range of from 1-part electrolytic temper fluid to 70 parts foodstuff to 1-part electrolytic temper fluid to 1-part foodstuff.

13. The method of claim 11, wherein combining the electrolytic temper fluid with the foodstuff comprises:
    adding the temper fluid to the foodstuff; and
    allowing the combined temper fluid and foodstuff to rest for a period of time until temper fluid penetrates the foodstuff.

14. The method of claim 11, wherein the foodstuff is a grain material.

15. The method of claim 14, wherein the grain material is selected from one of amaranth, barley, buckwheat, bulgur, corn, einkorn, farro, freekeh, Khorasan, millet, oats, *quinoa*, brown rice, rye, Sorghum, spelt, teff, wheat, and wild rice.

16. The method of claim 11, further comprising:
    after combining the anodic gas with the second composition to thereby provide a temper fluid and before combining the temper fluid with the foodstuff, combining the temper fluid with an additive, wherein the additive includes one or more of: a carboxylic acid, a buffering agent, and a surfactant.

17. The method of claim 16, wherein a carboxylic acid is combined with the temper fluid.

18. The method of claim 17, wherein the carboxylic acid is selected from the group consisting of: acetic acid, formic acid, lactic acid, propionic acid, 3-hydroxypropionic acid, butyric acid, gluconic acid, itaconic acid, citric acid, succinic acid, 3-hydroxypropionic acid, fumaric acid, maleic acid, and levulinic acid.

19. The method of claim 11, wherein the anodic gas and the oxidative acid fluid are both produced by passing a brine through an electrolytic cell.

20. The method of claim 11, wherein the anodic gas comprises one or more of chlorine, oxygen and ozone.

21. The method of claim 11, wherein combining the anodic gas with the second composition to thereby provide the temper fluid produces a temper fluid having an ORP in the range of from about +500 mv to about +1100 mv.

22. The method of claim 11, wherein the oxidative acidic fluid comprises hydrochloric acid, hypochlorous acid, or a combination of both.

23. The method of claim 11, wherein the temper fluid has a chlorine dioxide concentration of about 500 to about 1000 ppm.

24. The method of claim 23, wherein the temper fluid has an ORP in the range of from about +800 mv to about +1100 mv.

25. The method of claim 9, wherein the carboxylic acid comprises lactic acid, propionic acid, or a combination thereof.

26. The method of claim 17, wherein the carboxylic acid comprises lactic acid, propionic acid, or a combination thereof.

* * * * *